United States Patent [19]
Elliott et al.

[11] Patent Number: 5,504,693
[45] Date of Patent: Apr. 2, 1996

[54] FLOW CONTROL SYSTEM

[75] Inventors: Kenneth D. Elliott, Sugar Land, Tex.;
G. Charles Frenzel, Jr., Franklin, Tenn.

[73] Assignee: Omni Flow Company, Inc., Stafford, Tex.

[21] Appl. No.: 90,749

[22] Filed: Jul. 13, 1993

[51] Int. Cl.[6] .................................................. G01F 3/06
[52] U.S. Cl. .......................... 364/510; 324/220; 340/606
[58] Field of Search .............................. 364/510; 73/195, 73/196, 861.66, 861.77, 861.21, 204.14; 251/129.04, 129.11; 340/606, 615, 825.06; 324/220

[56] References Cited

U.S. PATENT DOCUMENTS

| | | | |
|---|---|---|---|
| 4,262,287 | 4/1981 | McLoughlin et al. | 73/195 |
| 4,429,581 | 2/1984 | Furmaga | 73/195 |
| 4,593,365 | 6/1986 | Haley, Jr. et al. | 73/195 |
| 4,630,474 | 12/1986 | Petroff | 73/196 |
| 4,805,118 | 2/1989 | Rishel | 73/195 |
| 4,827,430 | 5/1989 | Ald et al. | 73/195 |
| 4,888,706 | 12/1989 | Rush et al. | 364/510 |
| 4,951,224 | 8/1990 | Hokynar | 73/195 |
| 5,014,211 | 5/1991 | Turner et al. | 364/510 |
| 5,153,823 | 10/1992 | Ries et al. | 364/510 |
| 5,170,361 | 12/1992 | Reed | 364/510 |
| 5,172,332 | 12/1992 | Hungerford et al. | 364/510 |
| 5,315,530 | 5/1994 | Gerhardt et al. | 364/510 |

OTHER PUBLICATIONS

Barton First Rate Plus Direct Mount Flow Totalizer, 1992 by ITT Corporation (no month) pp. 1–3.
Barton Scanner 1130 Flow Computer, 1993 by ITT Corporation—pp. 1–11 (no month).

*Primary Examiner*—Emanuel T. Voeltz
*Assistant Examiner*—Thomas Peeso
*Attorney, Agent, or Firm*—Buskop Law Group; John R. Casperson

[57] ABSTRACT

A personal computer is operated in conjunction with an in line flow computer to provide real time flow data on the personal computer screen. Pipeline flow can be regulated and directed from the personal computer by flow control valves and by motor operated valves via a programmable logic controller and by the flow computer.

3 Claims, 1 Drawing Sheet

FLOW CONTROL SYSTEM

BACKGROUND OF THE INVENTION

In one aspect, this invention relates to a flow control system. In another aspect, this invention relates to measuring and controlling pipeline flow.

In the past, pipeline operators had to rely on the SCADA (Supervisory Control and Data Acquisition) Host for real time pipeline operating data. Since the SCADA Host was often remote, the availability of real time data was not very useful, at least for on-site technicians, operators and supervisors. A system to provide real time pipeline data on-site or near-site would be very desirable.

OBJECTS OF The INVENTION

It is an object of this invention to provide a "mini-SCADA" PC-based general-purpose text-graphics program for use with flow computers——to provide an inexpensive solution for operating personnel at measurement stations, terminals and plants.

It is another object of this invention to provide such a program in a complete, configurable package that requires no specialized training or programming skills——thereby eliminating the need for program tools, utilities and libraries or custom programming and training.

It is another object of this invention to provide real-time and historical data, color graphics displays and reporting functions, the ability to enter gravity and meter factor changes for running product, and batch scheduling capability as well as the ability to add or delete a batch, editing product and batch size data.

It is yet another object of this invention to provide a graphical display of the metering P&ID with real-time data displayed for all process variables including flow rates, totalizers, temperatures, pressures, densities, batch preset counters, valve status, batch end, valve position, meter and prover lineups.

SUMMARY OF THE INVENTION

In accordance with one embodiment of the invention, an apparatus comprises a plurality of sensor units attached to a pipeline at a flow measurement point. The sensors are for receiving input signals representative of pressure, temperature and flow of fluid through the pipeline. The sensors convert the inputs into electrical signals representative of the inputs. At low computer is connected to the sensor units by a suitable means for transmitting electrical signals from the sensor units to the flow computer. The flow computer receives the electrical signals and converts the electrical signals into digital flow signals representative of flow through the pipeline. The flow computer includes a means for establishing a digital time signal, a means for relating said digital flow signal with said digital time signal to form an item of time/flow rate data, and a memory means for retrievably storing the data for a short period of time. A general purpose personal computer is connected to the flow computer by a means for transmitting electrical data signals between the flow computer and the general purpose personal computer. The general purpose personal computer includes instruction means to signal the flow computer to retrieve items of time/flow rate data from the memory means and to transmit said time/flow rate data to the general purpose personal computer. The general purpose personal computer further includes a display screen and instruction means to display the time/flow rate data received from the flow computer on the display screen.

DETAILED DESCRIPTION OF THE INVENTION

Figure 1:
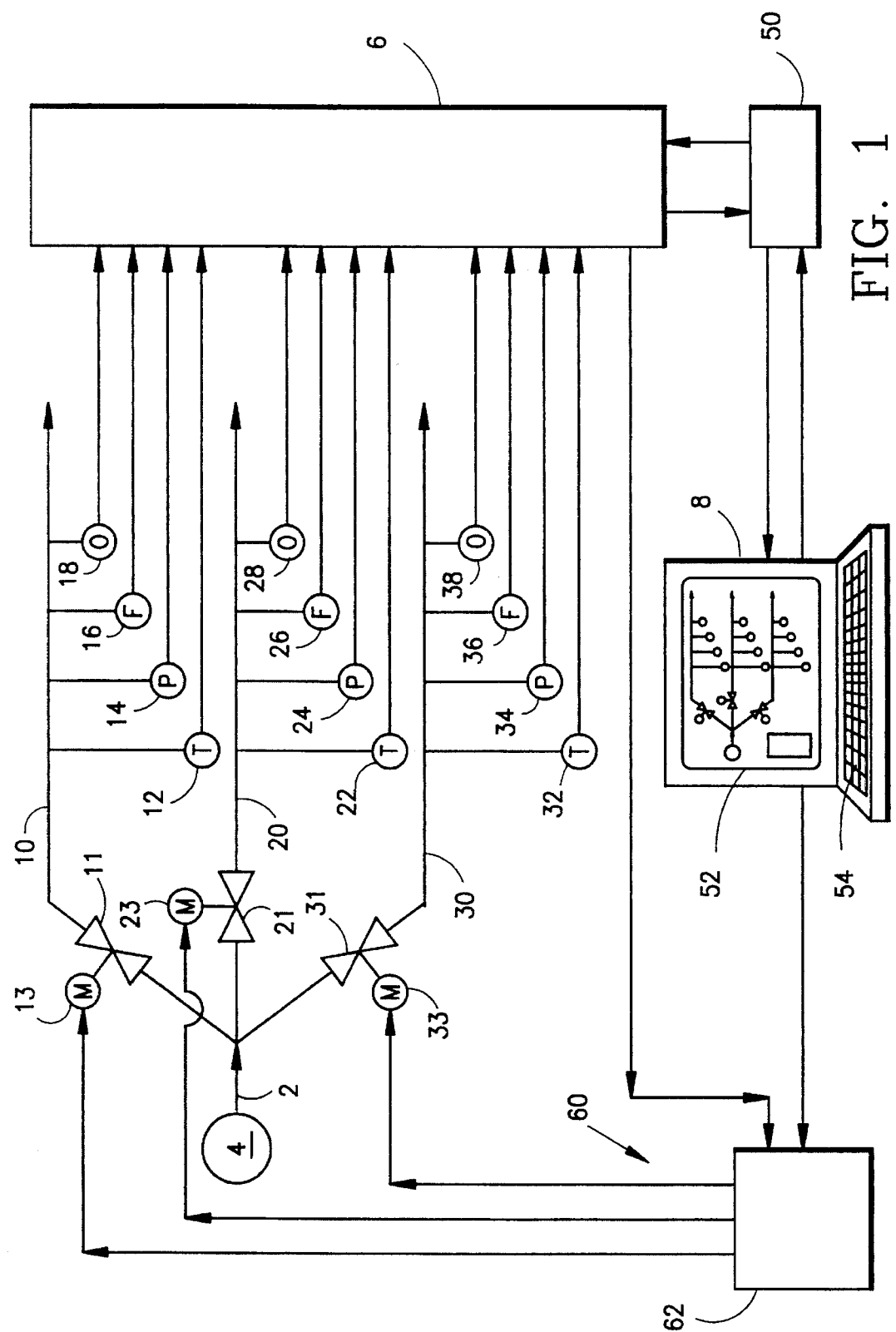
FIG. 1 schematically illustrates certain features of one embodiment of the present invention.

In one embodiment of the invention, a plurality of sensor units, for example, 12, 14, and 16 are attached to a pipeline 10 at a flow measurement point. The sensors are for receiving input signals representative of temperature (sensor 12), pressure (sensor 14), and flow (sensor 16), and converting the said inputs into electrical signals representative of said inputs. One or more additional sensors 18 are also usually provided. The sensor 18 can be for receiving an input signal representative of density, gravity, heating value, (usually expressed as British Thermal Unit- B.T.U.- value), gas analysis, or Brine, Sediment and Water (B. S. & W.) content.

The pipeline 10 will usually be a branch line of a main line 2 at flow measurement point. Other branch lines 20 and 30, with associated sensors 22, 24, 26, 28 and 32, 34, 36, 38 will usually be present. The main line 2 is connected to a fluid source 4 containing the fluid to be measured. Often, the source 4 will be of a hydrocarbon material, ranging from crude oil to natural gas. Since pipelines frequently carry slugs of different products, the additional sensors 18, 28 and 38 are generally selected to help differentiate products, and make cuts between product slugs.

The sensors are connected by means for transmitting said electrical signals from said sensor units to a flow computer 6. When several branch lines are present with associated sensor units, the sensors and transmission means form a network. The flow computer receives the electrical signals and converts them into a digital flow signals representative of flow through each of the pipelines 10, 20 and 30. The flow computer 6 includes a means for establishing a digital time signal, a means for relating the digital flow signal with the digital time signal to form an item of time/flow rate data, and memory means or retrievably storing the time/flow rate data for a time period of one second or less. Generally, the memory means will be in the form of a random access memory (RAM) in which the data is stored for a very short period of time, usually less than 0.5 sec (500 milliseconds).

A general purpose personal computer 8 is operably associated with the flow computer 6 by a means for transmitting electrical data signals between the computer 8 and the flow computer 6. IBM compatible PC's are suitable, such as those based on the Intel 486 chip. In the illustrated embodiment, the transmitting means includes a modem 50 although other means, such as hard wiring would also be operable. The general purpose personal computer includes an instruction means, generally a computer program, to signal the flow computer to retrieve items or time/flow rate data from the memory means and to transmit the time/flow rate data to the general purpose personal computer. The computer 8 further includes display screen 52 and instruction means such as a computer program to cause the general purpose digital computer to display the time/flow rate data received from the flow computer on the display screen.

In a preferred embodiment of the invention, the computer 6 further includes an instruction means to cause the personal computer to display a flow diagram representative of pipeline flow and an indicator on said flow diagram indicative of the location of the flow measurement point. Preferably, the instruction means causes the data be displayed adjacent to the flow measurement point indicator on the display screen. It is further preferred that the computer 8 include instruction means for displaying a menu on the display screen and a user interface device 54 such as the illustrated keyboard or a mouse, for making selections from the menu.

In a further preferred embodiment of the invention, the apparatus further comprises at least one motor valve 11 operatively associated with the pipeline 10. In the illustrated embodiment, a motor valve 11 is associated with the pipeline 10, a motor valve 21 is associated with the pipeline 20, and a motor valve 31 is associated with the pipeline 30. Each motor valve is connected to a driver. For example, the motor valve 11 is connected to driver 13, motor valve 21 is connected to driver 23, and motor valve 31 is connected to driver 33. A means 60 is provided for transmitting an actuation signal from the personal computer 6 to the drivers 13, 23, 33 for the motor valves. In one embodiment of the invention, the means 60 comprises a PLC (programmable logic controller) 62 and a means for transmitting a signal from the personal computer to the PLC and from the PLC to the drivers. In one embodiment, the means 60 includes the use of the flow computer 6 and a means for transmitting a signal from the personal computer 8 to the flow computer 6 and from the flow computer 6 to the PLC 62. The general purpose personal computer includes an instruction means for initiating the actuation signal responsive to inputs from said user interface.

One of the primary utilities of the present invention is in controlling batch flows through pipelines. To facilitate cutting the batches with the motor valves, the computer 8 further comprises an alarm means and a means for comparing the flow rate data retrieved from the flow computer with a predetermined limit value. The limit value can be an absolute value such as gravity, or it can be a derivative value, such as the rate of change in gravity with time. The parameter chosen will often depend on the disposal of the slop mixture between the batches. For example, the slop mixture between the two batches can be cut with the leading batch, the trailing batch, or diverted altogether. A means is associated with the comparison means and the alarm means for activating the alarms means when the flow rate data is outside of the predetermined limit value.

What is claimed is:

1. An apparatus comprising
   a) a plurality of sensor units disposed integrally in the wall of a pipeline at a flow measurement point for receiving input signals representative of pressure, temperature, gravity, gas analysis, Brine, Sediment and Water and the rate of change in gravity with time for the fluid flow, and a signal converter for converting said input signals into electrical signals representative of said inputs;
   b) a flow computer;
   c) a means for transmitting said electrical signals from said sensor units to the flow computer; wherein the flow computer receives said electrical signals and converts said electrical signals into a digital flow signal representative of flow through said pipeline, said flow computer including a means for establishing a digital time signal, a means for relating said digital flow signal with said digital time signal to form a unit of time/flow rate data, and memory means for retrievably storing said data for a short time period of one second or less;
   d) a general purpose personal computer; wherein said electrical signals are received by said flow computer, converted to data, stored in said memory means, and retrieved by the general purpose personal computer;
   e) a means for transmitting electrical data signals between the flow computer and the general purpose personal computer;
   f) a computer program for said general purpose personal computer to signal the flow computer to retrieve items of time/flow rate data from the memory means; and to transmit said time/flow rate data to the general purpose personal computer;
   g) a display screen;
   h) a computer program for said general purpose personal computer to display the time/flow rate data received from the flow computer on the display screen; and
   i) a computer program for said general purpose personal computer to display a flow diagram representative of pipeline flow and an indicator on said flow diagram indicative of the location of the flow measurement point; wherein said computer program for displaying the time/flow rate data instructs that said data be displayed adjacent to the flow measurement point indicator on the display screen;
   j) a motor valve operatively associated with said pipeline for controlling batch flows through the pipeline;
   k) a driver for said motor valve;
   l) a means for transmitting an actuation signal from said general purpose personal computer to said motor valve;
   m) a user interface for said general purpose personal computer; and
   n) a means tier said general purpose personal computer for initiating the actuation signal responsive to inputs from said user interface.

2. An apparatus comprising
   a) a plurality of sensor units disposed integrally in the wall of a pipeline at a flow measurement point for receiving input signals representative of pressure, temperature, gravity and the rate of change in gravity with time for the fluid flow, and a signal converter for converting said input signals into electrical signals representative of said inputs;
   b) flow computer;
   c) a means for transmitting said electrical signals from said sensor units to the flow computer; wherein the flow computer receives said electrical signals and converts said electrical signals into a digital flow signal representative of flow through said pipeline, said flow computer including a means for establishing a digital time signal, a means for relating said digital flow signal with said digital time signal to from a unit of time/flow rate data, and memory means for retrievably storing said data for a short time period of one second or less;
   d) a general purpose personal computer;
   e) a means for transmitting electrical data signals between the flow computer and the general purpose personal computer;
   f) a computer program for said general purpose personal computer to signal the flow computer to retrieve items of time/flow rate data from the memory means; and to transmit said time/flow rate data to the general purpose personal computer;
   g) a display screen;
   h) a computer program for said general purpose personal computer to display the time/flow rate data received from the flow computer on the display screen; and i) a computer program for said general purpose personal computer to display a flow diagram representative of pipeline flow and an indicator on said flow diagram indicative of the location of the flow measurement point; wherein said computer program for displaying the time/flow rate data instructs that said data be displayed adjacent to the flow measurement point indicator on the display screen;

j) a motor valve operatively associated with said pipeline for controlling batch flows through the pipeline;

k) a driver for said motor valve;

l) a means for transmitting an actuation signal from said general purpose personal computer to said motor valve;

m) a user interface for said general purpose personal computer; and n) a means for said general purpose personal computer for initiating the actuation signal responsive to inputs from said user interface;

wherein the means for transmitting an actuation signal from the general purpose personal computer to the motor valve includes a PLC.

3. An apparatus comprising a) a plurality of sensor units disposed integrally in the wall of a pipeline at a flow measurement point for receiving input signals representative of pressure, temperature, gravity and the rate of change in gravity with time for the fluid flow, and a signal converter for converting said input signals into electrical signals representative of said inputs;

b) a flow computer;

c) a means for transmitting said electrical signals from said sensor units to the flow computer; wherein the flow computer receives said electrical signals and converts said electrical signals into a digital flow signal representative of flow through said pipeline, said flow computer including a means for establishing a digital time signal, a means for relating said digital flow signal with said digital time signal to form a unit of time/flow rate data, and memory means for retrievably storing said data for a short time period of one second or less;

d) a general purpose personal computer;

e) a means for transmitting electrical data signals between the flow computer and the general purpose personal computer;

f) a computer program for said general purpose personal computer to signal the flow computer to retrieve items of time/flow rate data from the memory means; and to transmit said time/flow rate data to the general purpose personal computer;

g) a display screen;

h) a computer program for said general purpose personal computer to display the time/flow rate data received from the flow computer on the display screen; and i) a computer program for said general purpose personal computer to display a flow diagram representative of pipeline flow and an indicator on said flow diagram indicative of the location of the flow measurement point; wherein said computer program for displaying the time/flow rate data instructs that said data be displayed adjacent to the flow measurement point indicator on the display screen;

j) a motor valve operatively associated with said pipeline for controlling batch flows through the pipeline;

k) a driver for said motor valve;

l) a means for transmitting an actuation signal from said general purpose personal computer to said motor valve;

m) a user interface for said general purpose personal computer; and n) a means for said general purpose personal computer for initiating the actuation signal responsive to inputs from said user interface;

o) an alarm means for comparing the flow rate data retrieved from the flow computer with a predetermined limit value; and p) means associated with the comparison means and the alarm means for activating the alarms means when the flow rate data is outside of the predetermined limit value wherein the limit value is representative of fluid density.

\* \* \* \* \*

UNITED STATES PATENT AND TRADEMARK OFFICE
CERTIFICATE OF CORRECTION

PATENT NO. : 5,504,693
DATED : April 2, 1996
INVENTOR(S) : Elliott et al.

It is certified that error appears in the above-indentified patent and that said Letters Patent is hereby corrected as shown below:

Title page, item [75], Assignee is Omni Flow Computers, Inc.

instead of Omni Flow Company, Inc.

Signed and Sealed this

Twenty-ninth Day of October 1996

Attest:

BRUCE LEHMAN

*Attesting Officer*  *Commissioner of Patents and Trademarks*